US011530881B2

(12) United States Patent
Trojosky et al.

(10) Patent No.: US 11,530,881 B2
(45) Date of Patent: Dec. 20, 2022

(54) ROTARY COOLER AND METHOD FOR OPERATING A ROTARY COOLER

(71) Applicant: Allgaier Werke GmbH, Uhingen (DE)

(72) Inventors: Mathias Trojosky, Kirchheim unter Teck (DE); Karsten Kirchner, Donzdorf (DE)

(73) Assignee: Allgaier Werke GmbH, Uhingen (DE)

( * ) Notice: Subject to any disclaimer, the term of this patent is extended or adjusted under 35 U.S.C. 154(b) by 46 days.

(21) Appl. No.: 16/309,531

(22) PCT Filed: Jun. 12, 2017

(86) PCT No.: PCT/EP2017/000687
§ 371 (c)(1),
(2) Date: Dec. 13, 2018

(87) PCT Pub. No.: WO2017/215784
PCT Pub. Date: Dec. 21, 2017

(65) Prior Publication Data
US 2019/0186835 A1  Jun. 20, 2019

(30) Foreign Application Priority Data
Jun. 14, 2016 (DE) .......................... 102016007221.0

(51) Int. Cl.
*F28F 5/02* (2006.01)
*C04B 7/47* (2006.01)
(Continued)

(52) U.S. Cl.
CPC .................. *F28F 5/02* (2013.01); *C04B 7/47* (2013.01); *F27B 7/386* (2013.01); *F27D 15/028* (2013.01);
(Continued)

(58) Field of Classification Search
CPC .. F28F 5/02; F28F 13/12; F28D 7/103; F28D 15/0208; F28D 11/04; F28D 11/00;
(Continued)

(56) References Cited

U.S. PATENT DOCUMENTS

| 1,218,873 A | 3/1917 | Lennon |
| 1,711,297 A | 4/1929 | Sumner |

(Continued)

FOREIGN PATENT DOCUMENTS

| DE | 830471 C | * | 2/1952 | ............... C04B 7/47 |
| DE | 2936199 A1 | * | 3/1981 | ............... C10K 3/00 |

(Continued)

OTHER PUBLICATIONS

Bellows Expansion Joints for Heat Exchangers—FLEXIDER USA (Feb. 2013) (Year: 2013).*

(Continued)

*Primary Examiner* — Jenna M Hopkins
(74) *Attorney, Agent, or Firm* — Peter A. Nieves; Sheehan Phinney Bass & Green PA

(57) ABSTRACT

A rotary cooler is provided, consisting of a plurality of transport tubes for transporting material to be cooled, wherein the plurality of transport tubes are arranged about an axis of rotation and are adapted to be filled jointly via a filling region with material to be cooled, characterized in that each transport tube is arranged substantially concentrically in a cooling tube in which a cooling medium flows and cools the material to be cooled via the wall of the transport tube. Furthermore, a method for operating said rotary cooler is provided.

16 Claims, 6 Drawing Sheets

Figure 1:
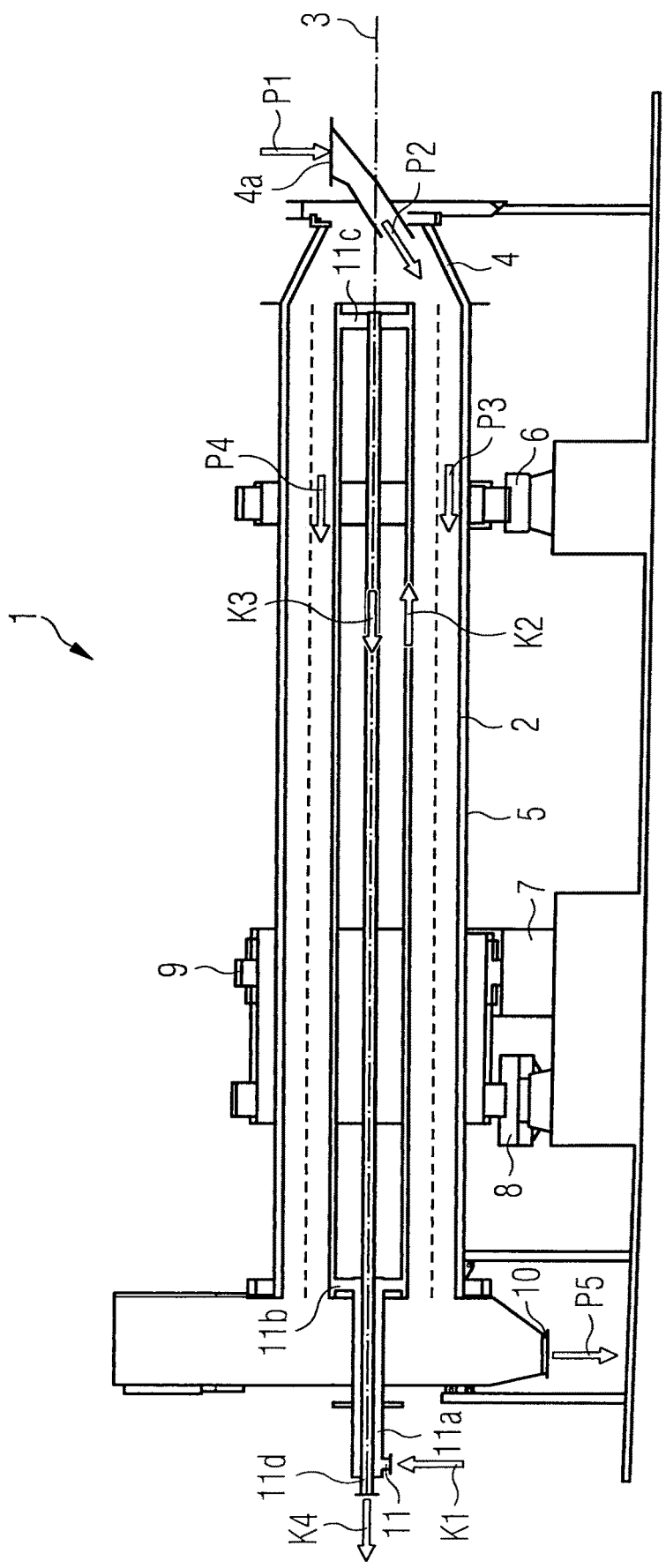

(51) Int. Cl.
*F27B 7/38* (2006.01)
*F28D 11/04* (2006.01)
*F28D 7/10* (2006.01)
*F28F 13/12* (2006.01)
*F27D 15/02* (2006.01)

(52) U.S. Cl.
CPC .............. *F28D 7/106* (2013.01); *F28D 11/04* (2013.01); *F28F 13/12* (2013.01); *F28F 13/125* (2013.01); *F28F 2265/26* (2013.01)

(58) Field of Classification Search
CPC . F28D 11/02; F28D 7/16; F28D 7/106; F28D 7/14; F28D 7/12; F27B 1/386; F27B 7/368; F27B 7/386; F27D 15/028; C04B 7/47
See application file for complete search history.

(56) References Cited

U.S. PATENT DOCUMENTS

| | | | | |
|---|---|---|---|---|
| 2,137,373 | A * | 11/1938 | Williams, Jr. | ......... F28D 7/106 62/298 |
| 2,283,129 | A | 5/1942 | Roubal | |
| 2,348,446 | A * | 5/1944 | Becker | ................ F27D 15/028 432/84 |
| 2,362,539 | A | 11/1944 | Cheesman | |
| 2,971,751 | A * | 2/1961 | Andersen | ................ F27B 7/40 432/106 |
| 3,208,512 | A * | 9/1965 | Kalmbach | ................ F27B 7/14 165/88 |
| 3,249,154 | A * | 5/1966 | Legrand | ................ F28F 1/426 165/164 |
| 3,667,542 | A * | 6/1972 | Parkes | ..................... F28F 5/02 165/89 |
| 3,788,392 | A * | 1/1974 | Abbott | ................... F28D 11/04 165/92 |
| 3,800,865 | A * | 4/1974 | Onarheim | .............. F28D 11/00 165/92 |
| 3,829,282 | A | 8/1974 | Deussner | |
| 3,845,941 | A * | 11/1974 | Mendenhall | ........ E01C 19/1036 366/24 |
| 3,920,381 | A | 11/1975 | Heinemann | |
| 3,975,147 | A * | 8/1976 | Vering | ...................... F27B 7/40 432/106 |
| 4,021,195 | A | 5/1977 | Sylvest | |
| 4,089,634 | A | 5/1978 | Sylvest | |
| 4,131,418 | A * | 12/1978 | Kramm | .................... F27B 7/40 432/106 |
| 4,377,202 | A | 3/1983 | Nakamura | |
| 4,492,570 | A * | 1/1985 | Suzuki | .................. F27B 7/2033 432/106 |
| 4,557,804 | A | 12/1985 | Baumgartner | |
| 4,640,344 | A * | 2/1987 | Pravda | ................ F28D 15/0208 165/111 |
| 4,711,297 | A | 12/1987 | Haacker | |
| 2019/0186835 | A1 * | 6/2019 | Trojosky | ................ F28D 7/106 |

FOREIGN PATENT DOCUMENTS

| | | | | |
|---|---|---|---|---|
| DE | 3534991 | | 4/1987 | |
| DE | 3331744 | | 9/1987 | |
| DE | 3722319 | A1 * | 1/1989 | .............. F28D 7/12 |
| DE | 4406382 | | 8/1997 | |
| DE | 10230511 | | 8/2003 | |
| EP | 0217913 | | 2/1990 | |
| EP | 0567467 | | 8/1994 | |
| EP | 2889569 | | 7/2015 | |
| EP | 2889569 | A1 * | 7/2015 | ........... F27D 15/028 |
| FR | 995986 | A * | 12/1951 | .............. F28D 7/12 |
| FR | 1331071 | A * | 6/1963 | ........ B01D 19/0026 |
| FR | 2495301 | A1 * | 6/1982 | ............. F28F 19/00 |
| FR | 2818367 | A1 * | 6/2002 | ............. F28D 11/02 |

OTHER PUBLICATIONS

DE3722319A1 English Translation (Year: 1989).*
FR1331071A English Translation (Year: 1963).*
DE830471C English Translation (Year: 1952).*
International Preliminary Examination Report for PCT/EP2017/000687, dated Aug. 20, 2018.
International Search Report for PCT/EP2017/000687 dated August 21, 2017

* cited by examiner

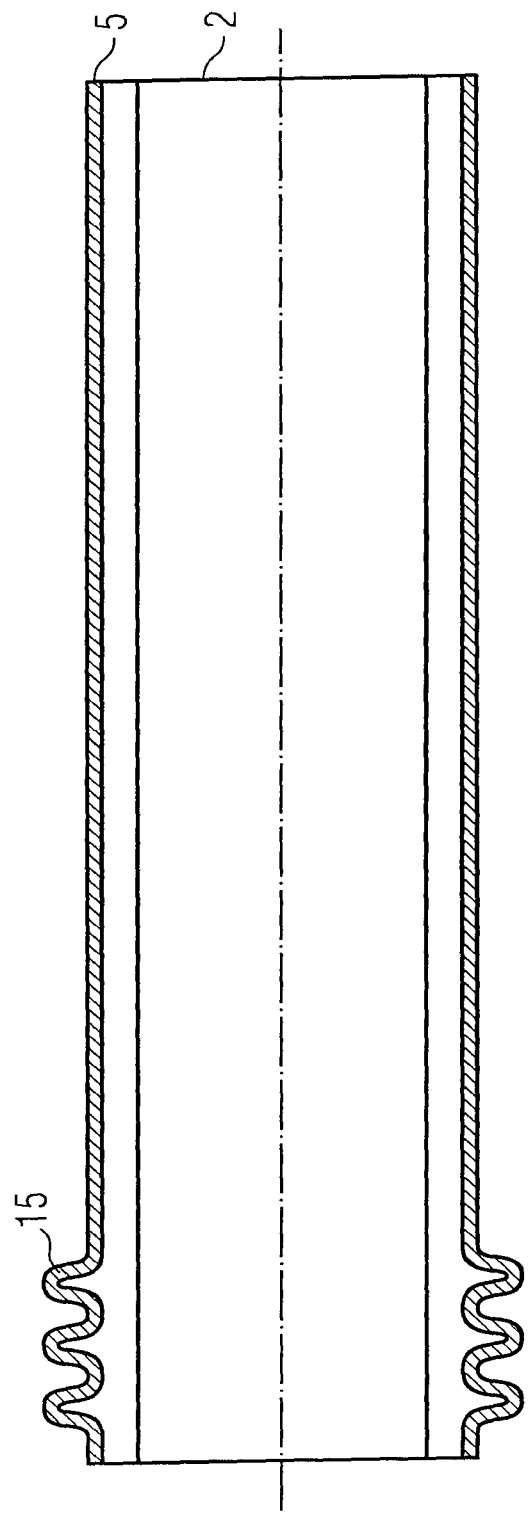

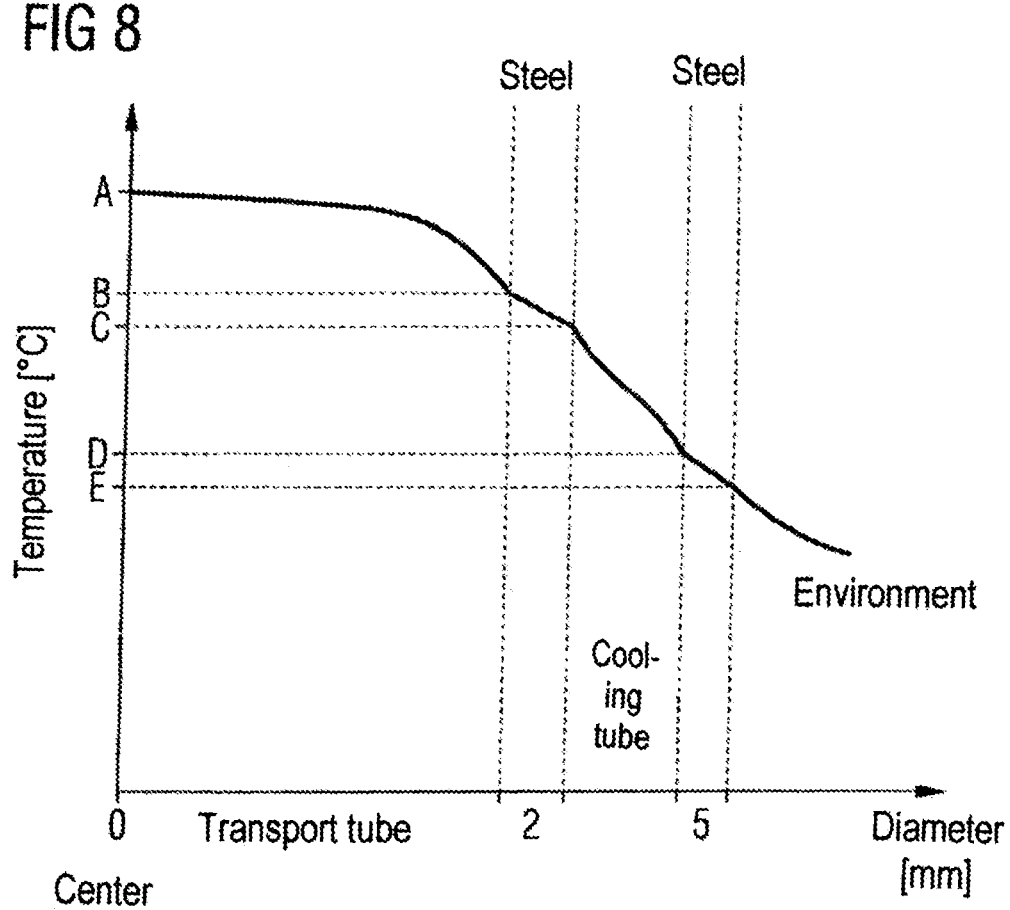

ROTARY COOLER AND METHOD FOR OPERATING A ROTARY COOLER

CROSS-REFERENCE TO RELATED APPLICATIONS

This application is a national stage entry of International Application PCT/EP2017/000687, filed Jun. 12, 2017, which claims the benefit of German Patent Application No. 102016007221.0, filed Jun. 14, 2016. The contents of these prior applications are incorporated by reference herein in their entirety, The subject matter of the present invention is a rotary cooler as well as a method for operating a rotary cooler and a method for cooling material.

In the state of the art various devices and methods for cooling very hot products are known. In various industrial fields, such as especially in metallurgy, in chemical industry, in building material and cement industry as well as in recycling industry, coolers are required for cooling very high products, such as, for instance, burnt pigments, slags, metal oxides and metal hydroxides, cement clinker, iron sponge, tinder, charcoal, catalysts, coke, residual materials of ironworks, etc. Without the cooling of the very hot products further processing is often not possible. Frequently, the heat energy contained in the solid substance is to be recovered at least partially in the scope of the technologically required cooling.

Therefore, there exist various technologies, i.e. devices and methods for cooling such bulk material from a starting temperature of e.g. 700° C. to 1,400° C. to final temperatures of e.g. 80° C. to 200° C.

In addition to the use of coolers which make use of a direct contact of the ambient air with the material to be cooled, rotary coolers operated indirectly with air or with water are used for this object. "Indirectly" means that the cooling medium (water or air) does not get in direct contact with the hot product to be cooled, but that a heat exchange takes place from the hot product to the cooling medium via an apparatus wall separating the media.

The patent documents U.S. Pat. Nos. 1,218,873; 2,283,129, and 2,348,446 disclose solid matter coolers operating with a single, closed drum housing as well as those which conduct the solid matter in a plurality of tubes within a drum.

Furthermore, the patent documents DE 4406382 C2; DE 3331744 C2; U.S. Pat. Nos. 3,829,282; 3,920,381; 4,021,195; 4,089,634, and 4,131,418 disclose that hot bulk material, such as, for instance, clinkers occurring in cement industry, which are hot and have to be cooled, are introduced in a plurality of tubes arranged about an outlet end of a rotary furnace and are transported by the rotation of the furnace and hence of the cooling tubes. In the case of such coolers the cooling of the cooling tubes conducting the hot product is performed by free convection of the ambient air.

In the most simple constructions of rotary coolers which are indirectly cooled with water, a rotary tube is sprayed with water from outside, or the drum moves through a water bath, as described in patent document U.S. Pat. No. 4,557,804, so that the surface of the rotating drum is wetted with water and cools the apparatus walls while in turn the hot product in the drum is cooled by heat dissipation to the cooled apparatus wall.

EP 0 567 467 B1 discloses a rotary cooler with a rotary tube rotating within a stationary, brick-built sheathing and in which the cooling medium (air or water) flows in the cavity formed between the rotary tube and the brickwork.

A similar solution in which the drum jacket is formed by a tube system flown through by cooling water is known from the patent documents U.S. Pat. Nos. 1,711,297; 4,711,297 and/or EP 0 217 113 A2; DE 3534991 A1.

The construction of such a simple drum entails a small surface for heat exchange and hence a low cooling efficiency of the apparatus.

The patent document U.S. Pat. No. 2,362,539 describes a cooler operating with a plurality of product-conducting tubes arranged on a circular circumference, wherein the tubes are sprayed from above with water for cooling and the water is discharged to a trough positioned below.

Another construction which is supplied especially by the company Grenzebach and by the company GEA Barr-Rosin are so-called "sectional coolers". For increasing the heat exchanger face, e.g. 6 or 8 chambers ("sections") are provided which are arranged in a rotary drum housing, so that a cavity is produced between the chambers.

For cooling the hot product being in the chambers ("sections") and/or transported through the chambers, cooling water is guided through the cavities formed between the sections in the drum housing. The introduction and discharge of the cooling water takes place via a sealed swivel joint at the side of the product outlet of the drum and via tube connections to or from the individual double tubes.

Such sectional coolers have a particular way of construction which results in high cost of materials and high amount of work during manufacturing, especially due to the extensive welding required. Moreover, the drum housing itself necessarily has high weight since the drum and the walls of the chambers have to be made thick-walled for reasons of solidity. Both result in a high overall weight of the apparatus.

The sectional coolers conduct the cooling water in the respective lower sections since, due to gravity, only those are flown through with water. A complete filling of the sections with cooling water is not possible. Consequently, the walls of the chambers ("sections") being at the top during each rotation, and the hot solid matter contained therein, are not cooled permanently and hence not cooled optimally.

Furthermore, the flow of the cooling water in the cavities formed by the sections is not smooth, so that an irregular heat transfer takes place between the hot walls of the sections and the cooling water.

It is thus an object of the invention to provide a device and a method by means of which the drawbacks of the state of the art, especially of the sectional coolers, are overcome.

The rotary cooler according to the invention consists of a plurality of transport tubes for transporting material to be cooled, wherein the plurality of transport tubes are arranged about an axis of rotation and are adapted to be filled jointly via a filling region (for example, a filling cone 4 (FIG. 1)) with material to be cooled, wherein each transport tube is arranged substantially concentrically in a cooling tube in which a cooling medium flows and cools the material to be cooled via the wall of the transport tube.

Advantageously, the plurality of transport tubes is arranged in bundles in regions, wherein these regions are adapted for the bearing and/or rotation of the rotary cooler. These regions may be formed as annular collars comprising recesses for accommodating the cooling tubes.

Advantageously, the rotation of the rotary cooler may take place via a gear ring with chain drive or a sprocket. It is also possible to rotate the rotary cooler according to the invention by other drive variants.

This may, for instance, be performed by a friction gear drive with driven guide rollers on which the race is mounted.

It is also possible to rotate the rotary cooler in accordance with the invention via a direct drive, for instance, via an attachable gear motor.

Advantageously, the plurality of transport tubes end in a region in which the material to be cooled exits, so that the material to be cooled is available with lower temperature in this product outlet region.

Expediently, for avoiding dust, this product outlet region is substantially closed and comprises further continuative devices.

In order to guarantee the transport of the material to be cooled in the transport tube from the region of the product inlet to the region of the product outlet, the transport tubes preferably have an inclination between 1 degree and 8 degrees, especially preferred between 2 degrees and 5 degrees.

Advantageously, the plurality of cooling tubes are connected with each other via ducts and enable moreover that the cooling tubes are adapted to be pressurized with the cooling medium. By the possibility of pressurizing the cooling tubes it can be achieved that the cooling medium, in the scope of cooling, may become hotter than 100° C. before evaporation of the cooling medium starts. Apart from water, other cooling mediums are also conceivable.

Especially in the case of very hot bulk material of up to 1400° C. it may be of advantage if the cooling medium may become as hot as 160° C. This is, however, only possible if the cooling tubes are adapted to be pressurized. The construction of the rotary cooler according to the invention permits both the transport tubes and the cooling tubes to be made of commercially available tubes. Thus, complex welding work, as it is required with the manufacturing of the known rotary coolers, is omitted. Moreover, the use of commercially available tubes facilitates the manufacturing of coolers adapted to be pressurized.

In a preferred embodiment of the present invention it is of advantage if the direction of flow of the cooling medium is optionally contrary to or in line with the direction of transport of the material to be cooled. In this respect it has to be taken into account that the direction of transport of the material to be cooled is predetermined by the inclination of the transport tubes. In accordance with the invention, however, the direction of flow of the cooling medium, for instance, of the cooling water, may be changed. It has to be observed in this respect that the value of the temperature difference $\Delta\vartheta$ between the material to be cooled and the cooling medium, for instance, cooling water, should always be as large as possible. This is because the cooling performance is optimized by a temperature difference $\Delta\vartheta$ which is as large as possible.

In the case of a counter flow operation the direction of flow of the cooling medium is contrary to the direction of transport of the material to be cooled. In the case of an equal flow operation both have the same direction of transport. In the case of a mixed form of both variants the direction of flow of the cooling medium may also proceed at an angle of up to 90° C. in a so-called cross counter flow or cross equal flow.

Advantageously, elements are provided within the transport tubes which promote the mixing and circulating as well as the transport of the material to be cooled. The mixing and circulating of the material to be cooled has the advantage that always fresh material to be cooled is brought into contact with the wall of the transport tube and thus the temperature difference $\Delta\vartheta$ between the wall of the transport tube and the outer wall of the transport tube which is flown around by the cooling medium is as large as possible. This is because the actual indirect cooling of the material to be cooled takes place via the transport tube which is flown by the cooling medium.

The permanent mixing and circulating of the material to be cooled in the transport tube ensures that the temperature distribution within a section in the transport tube is as homogeneous as possible.

Furthermore, it may be of advantage if, inside each transport tube, additional ribs and guide plates are arranged which increase the inner surface of the transport tube and thus have a favorable influence on the heat transfer and the mixing.

Advantageously, these elements are arranged substantially in the longitudinal direction of the transport tubes. It is, however, also possible to form these elements in the form of ribs and guide plates for generating turbulences, mixing, circulation, and transport of the material to be cooled in the form of one or several structures. These structures may be fixed or detachable. They may be designed as exchangeable inserts and consist of a kind of basket which is inserted in the transport tube. It is particularly advantageous that these inserts are cheap to manufacture, easy to remove from the transport tube for cleaning and maintenance purposes, and adaptable in shape and function to the nature of the material to be cooled.

In the case of bulk material with minor particles it may be of advantage to only use a basket insert which is provided with a plurality of guide plates and mixing aids. In the case of bulk material with major particles it may be of advantage to use a basket insert which has a minor number of guide plates and mixing aids. It is also possible to optimize, with a plurality of basket inserts, the mixing in correspondence with the cooling performance. Thus, it may be expedient to cause a coarser, i.e. worse mixing at the beginning of the cooling, which is improved in the course of the cooling, i.e. during the transport toward the product outlet. By means of basket inserts with different shapes and guide plates an adaptation to the desired cooling, mixing, and circulating behavior is possible.

For further improvement of the cooling performance it is provided in accordance with the invention that the annular gap between the transport tube and the cooling tube comprises elements which promote a turbulent flow of the cooling medium. A turbulent flow in the annular gap is of advantage since this distributes the temperature distribution in the cooling medium more evenly than in the case of a laminar flow. The findings resulting in a mixing in the transport tube also have to be transferred to the cooling tube. The higher the temperature difference $\Delta\vartheta$ is between the outer surface of the transport tube and the inner surface of the transport tube, the better is the cooling performance. In order to achieve this it is of advantage if the cooling medium is mixed as good as possible; this is achieved by a turbulent flow.

Advantageously, at least one flow directing element is provided in the annular gap between the transport tube and the cooling tube. The flow directing element in accordance with the invention is expediently arranged on the outer wall of the transport tube and may have different shapes. These shapes may, for instance, be designed as baffles or as guiding surfaces, or as a mixed form of these two types of elements. Furthermore it is possible that, in addition to the planar elements, flow directing elements for deflecting the flow are occasionally provided, which are substantially designed punctually and thus produce a turbulent flow.

In a preferred embodiment of the present invention the at least one flow directing element is arranged on the outer wall of a transport tube in the shape of a screw winding.

This flow directing element according to the invention may be formed by applying a guide plate on the outer wall of the transport tube, for instance, by welding. After the finishing of this flow directing element the transport tube is inserted into the cooling tube, wherein the flow directing element need not get to lie at the inner side of the cooling tube.

For improving the turbulent flow it may be useful if a second flow directing element is arranged at the outer wall of the transport tube. The second flow directing element may expediently be arranged such that it is offset by 180° at the outer wall and also has the shape of a screw winding.

Advantageously, further flow directing elements of this type are mounted on the outer wall of the transport tube. Apart from being fixed by welding it is conceivable in accordance with the invention that the flow directing elements are connected releasably with the transport tube so as to either facilitate their maintenance or be able to adjust the turbulent flow optimally by particular baffles of the guiding surfaces.

The design of the cooling medium conductance in accordance with the invention in the rotary cooler in accordance with the invention results in a complete flowing around of the entire available heat transfer face and to a directed flow of the cooling medium, and hence to an improvement of the cooling performance as compared to known cooler designs.

Another embodiment of the present rotary cooler comprises, instead of the tubes positioned inside each other and consisting of cooling tube and transport tube, a product-conducting tube with an enclosing metal sheet welded to the outer side thereof, for instance, by means of spot welding. The enclosing metal sheet is inflated with high pressure for producing a volume conducting the cooling medium. The cooling medium is guided through the cavity produced. Double-wall heat exchanger tubes which are manufactured in this manner and which are available in practice as standard bought-in parts can further reduce the weight of the rotary cooler in accordance with the invention.

In a further embodiment of the present invention the cooling tubes are provided with compensators which compensate thermal strains.

Thermal strains may occur throughout the device by the high temperature differences between the transport and the cooling tubes. If, for instance, bulk material with approx. 1,000° C. is filled in the filling cone, the transport tube will heat very quickly to this initial temperature at the inner side thereof. The temperature profile between the bulk material and the outer wall of the cooling tube leads, exactly at the beginning of the cooling process, in the vicinity of the filling cone to a very rapid temperature drop across the cross-section, i.e. from the bulk material via the transport tube, the cooling medium, and finally in the outer wall of the cooling tube. Due to the construction the transport tube and the cooling tube are, exactly in the filling region, positioned close to each other and are connected with each other by constructional elements. This vicinity results in that particularly high temperature differences occur on a small space, which constitute a high thermal strain for the components. For avoiding cracks and breaks, especially of pressurized tubes transporting a very hot cooling medium, it is advantageous in accordance with the invention to provide at least one compensator in the cooling tubes which is adapted to compensate thermal strains.

In a further embodiment of the present invention the cooling process is initiated in the region of the product inlet already. Advantageously, the cone for introducing the hot solid material to be cooled is designed with double walls and optionally incorporated in the cooling medium circuit. Thus, first cooling effects may already be realized at a very early time in the process sequence.

The method in accordance with the invention makes use of a rotary cooler according to the present description and Figures.

The method for cooling bulk material in accordance with the invention consists of the steps of
1. introducing material to be cooled in at least one transport tube which is enclosed by a cooling tube in which a cooling medium flows;
2. transporting the material to be cooled from one end of the at least one transport tube to the other end thereof, wherein the material to be cooled is permanently cooled by the cooling medium;
3. rotating the transport tubes permanently about an axis;
4. outputting the cooled material.

Advantageously, the method according to the invention comprises the further method step according to which the cooling medium is set to turbulences by baffles in the annular gap between the transport tube and the cooling tube.

A preferred embodiment of the present invention will be explained in detail by means of the drawings.

Figure 2:
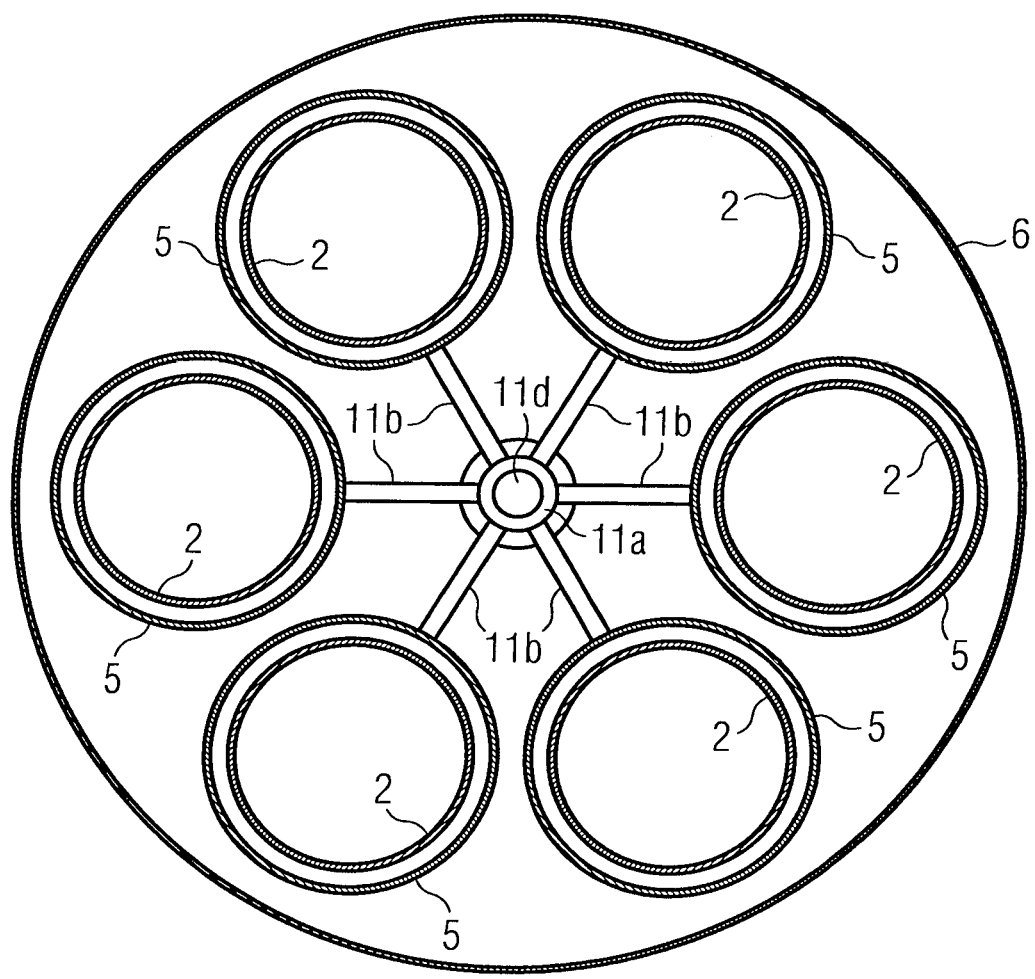
Figure 3:
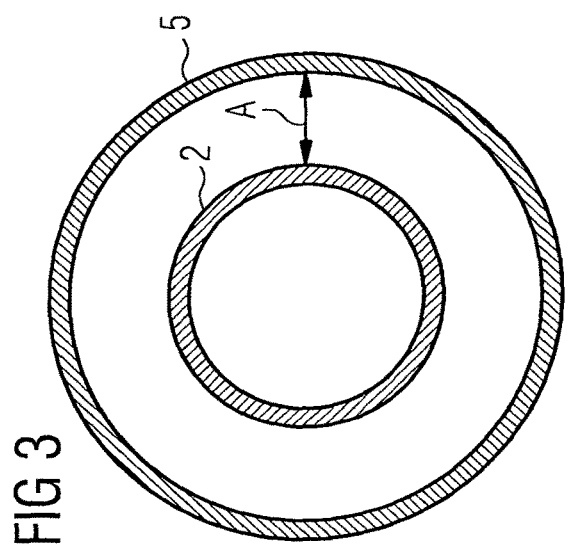
Figure 4:
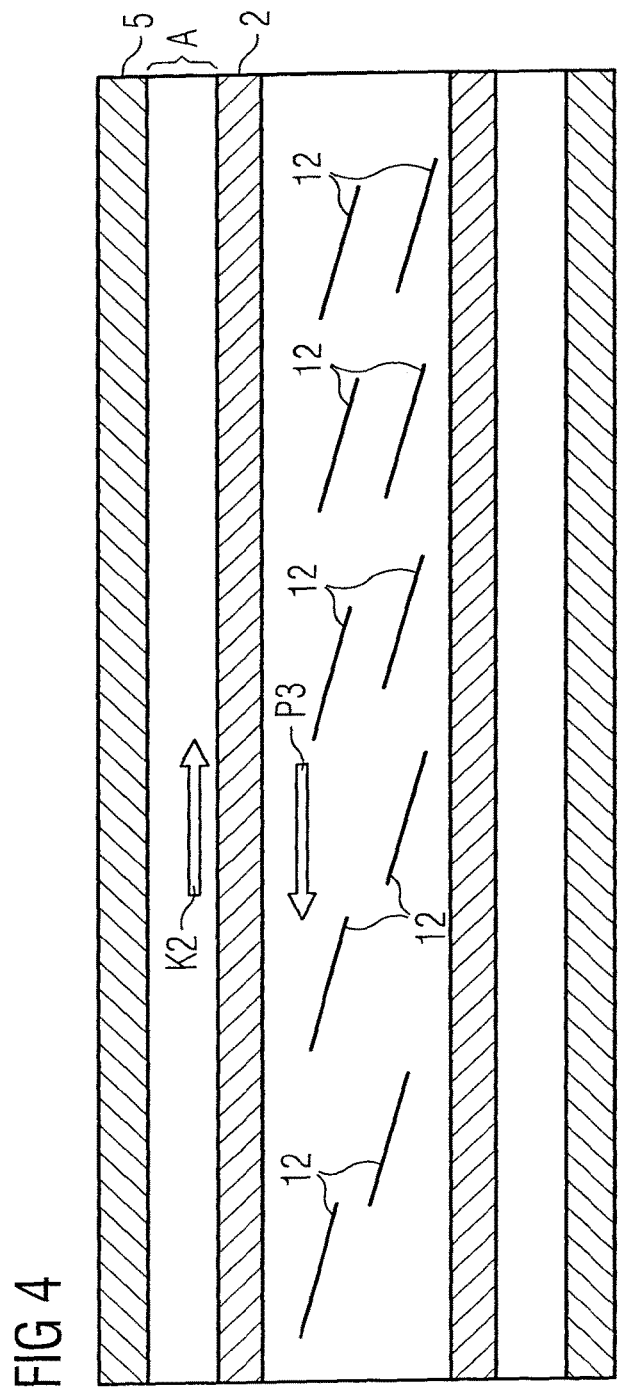
Figure 5:
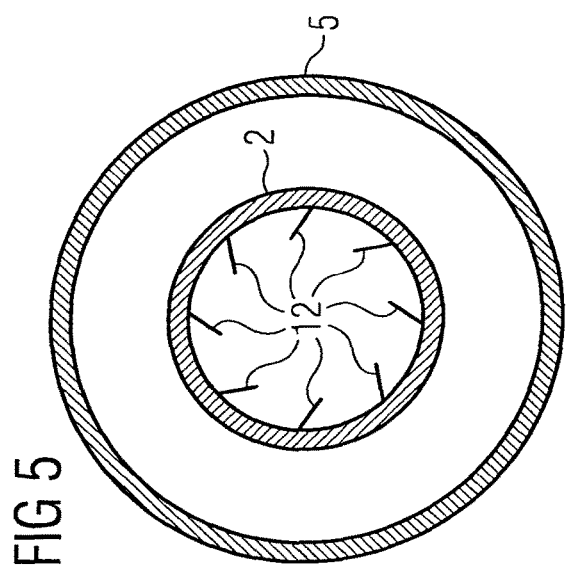
Figure 6:
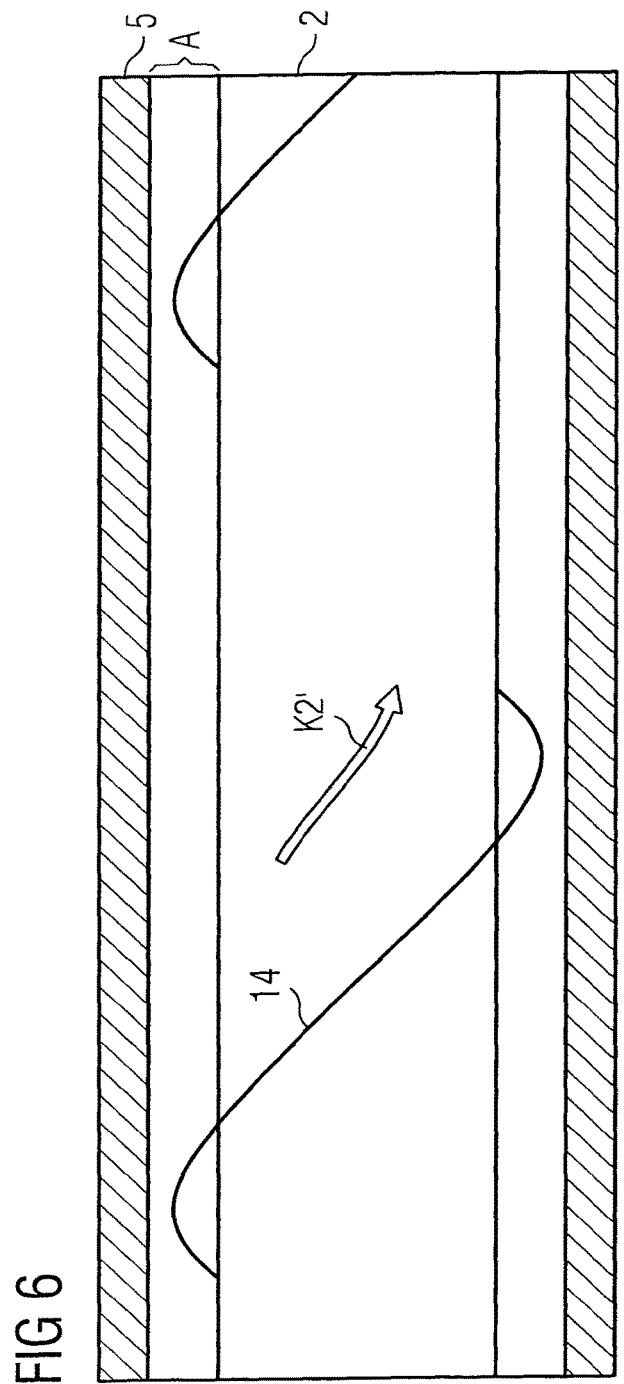

There show:

FIG. 1 a schematic overview of the rotary cooler in accordance with the invention;

FIG. 2 a schematic sectional view through the tube bundles of the rotary cooler in accordance with the invention;

FIG. 3 a schematic sectional view through a transport and cooling tube bundle of the rotary cooler in accordance with the invention;

FIG. 4 a schematic representation of a longitudinal section through a transport and cooling tube of the rotary cooler in accordance with the invention;

FIG. 5 a schematic representation of a cross-section through a transport and cooling tube of the rotary cooler in accordance with the invention;

FIG. 6 a schematic representation of a transport tube and of a longitudinal section through a cooling tube of the rotary cooler in accordance with the invention;

FIG. 7 a schematic representation of a transport tube and of a longitudinal section through a cooling tube with a compensator in accordance with the invention of the rotary cooler in accordance with the invention;

FIG. 8 a schematic representation of an exemplary temperature profile in the tube cross-section of the rotary cooler in accordance with the invention.

FIG. 1 illustrates a schematic view with partial sections of a rotary cooler 1 in accordance with the invention. In the intended use the material to be cooled (without reference number) is poured into the product inlet 4a of the filling cone 4. The transport of the material to be cooled may take place in various ways. After being introduced in the product inlet 4a the material to be cooled drops down in the direction of the arrow P1 due to gravity. The tube bundles of the transport tubes 2 which are enclosed substantially concentrically by the cooling tubes 5 are positioned downstream of the product inlet. The number of transport tubes 2 may range between 3 and 9, and there is basically no upper limit. Relevant for the number of transport and cooling tubes are the controllability of the masses and the safeguarding of the smooth rotation of the tube bundles.

In accordance with FIG. 1 the transport tubes 2 are, along with the cooling tubes 5, arranged about an axis of rotation 3 and rotate, driven by a gear ring or a chain drive 9, above the bearing 7. For support of the rotary cooler in accordance with the invention, it rests expediently on bearings, wherein these bearings are designed as races 6, 8. The position of the races 6, 8 is determined by the dimensions of the rotary cooler in accordance with the invention. A larger number of bearings may be useful with other dimensions.

Due to gravity the material to be cooled is transported along the arrows P2 and P3 in the bottom transport tubes 2 (in the instant sectional view this is only one transport tube 2) and is shifted through the angle of inclination of the transport tubes of between 1° and 9° along the arrows P3 and P4 in FIG. 1 to the left. Elements (not illustrated in FIG. 1) are provided in the transport tubes which favor and promote the transport, the circulating, the rearranging, and the mixing of the material to be cooled.

The transport tubes 2 are surrounded by an annular gap which is confined by the cooling tubes 5 (see in detail in the following Figures). The cooling medium, for instance water, flows through this annular gap. The cooling medium is introduced in the cooling tubes 5 through a circuit 11, 11a, 11b, 11c, and 11d and discharged. In accordance with FIG. 1 the cooling medium flows through the inlet 11 in the direction of the arrow K1 with a first temperature, e.g. approx. 10° C., into the cooling circuit and from there via spoke-like supply lines 11b into the cooling tubes 5. In this manner the cooling medium is transported in the counter flow for cooling the material to be cooled.

At the end of the cooling tube 5 the cooling medium flows through spoke-like discharge lines 11c in the direction of the arrow K3 into a central discharge tube 11d and leaves the cooling circuit in the direction of the arrow K4. The material to be cooled is transported in the transport tubes 2 to the product outlet 10 and leaves, preferably due to gravity, the rotary cooler in the direction of the arrow P5.

FIG. 2 illustrates a schematic sectional view through the tube bundles of the rotary cooler in accordance with the invention which comprises, as chosen in this embodiment, six cooling tubes 5 and six transport tubes 2. The cooling medium is fed into the cooling circuit through the tube 11a. From there the cooling medium flows via the supply tubes 11b into the cooling tubes 5. The supply tubes 11b are arranged in a spoke-like manner and are, due to their completely circular cross-section, adapted to be pressurized. In FIG. 2 the supply tubes 11b cover the discharge tubes 11c which are also arranged in a spoke-like manner and through which the cooling medium flows back so as to finally leave the cooling circuit again through the line 11d.

In the cooling tubes 5, separated by an annular gap, the transport tubes are arranged in which the material to be cooled is transported.

FIG. 3 illustrates an enlarged sectional view through a cooling tube 5 and a transport tube 2, wherein the proportions of the dimensions do not correspond to reality. The annular gap A through which the cooling medium flows has to be dimensioned such that both the heat exchange and the carrying off of the cooling medium are optimized. For this purpose it is of advantage that a flow as turbulent as possible is generated in the annular gap. The wall thickness of the transport tube 2 should be dimensioned such that the heat exchange can be performed as quickly as possible. The thinner the wall thickness is, the quicker the heat is discharged from the material to be cooled. A thin wall thickness, however, is at the expense of the stability of the transport tube 2. It is essential to find an optimum dimensioning in this respect. The wall thickness of the cooling tube 5 is relevant both for the stability and for the heat exchange to the environment.

FIG. 4 illustrates a schematic longitudinal section through a transport tube 2 and a cooling tube 5. The annular gap A is not to scale, and neither are the wall thicknesses of the cooling tube 5 and of the transport tube 2. Elements 12 which favor and promote the mixing, circulating, and the transport in the direction P3 are arranged in the transport tube 2. Expediently, the arrangement of the cooling tubes 5 and transport tubes 2 in accordance with the invention is inclined relative to the horizontal, preferably between 1 degree and 8 degrees, especially preferred between 2 degrees and 5 degrees. This inclination and the use of the elements 12 favors a transport through the transport tube 2. In the instant embodiment the cooling medium flows in the direction K2, i.e. in the counter flow operation.

FIG. 5 illustrates a schematic cross-section through the arrangement in accordance with the invention according to claim 4, wherein the elements 12 are not to scale. Likewise, the shape of the elements is illustrated schematically only. An element 12 may be designed as a straight guide plate, or it may comprise a curvature or breakthroughs, or it may consist of stirrer-like ends serving to cause a mixing of material to be cooled which is favorable for the even distribution of temperature. Furthermore, it is possible that elements in different temperature zones of the transport tube 2 have different shapes.

FIG. 6 illustrates a schematic longitudinal section through a cooling tube 5 and a flow directing element 14 which is applied to the outer wall of the transport tube 2 and thus lies completely in the annular gap A. The flow directing element 14 may consist of one piece, as illustrated, or of several pieces. The illustrated flow directing element 14 extends like a screw winding around the outer wall of the transport tube 2 and forces the cooling medium to a turbulent flow path in the direction of the arrow K2'. The flow direction K2' has the additional advantage that the path covered by any cooling medium particle is substantially longer than the length of the cooling tube 2. Thus, the heat transfer is also influenced favorably since the cooling medium can take up heat for a longer time as if it were only flowing along the length of the cooling tube. For further improvement of the turbulences in the cooling medium, which are responsible for the mixing of the cooling medium, it may be useful to break through the webs of the flow directing element 14 in some places.

FIG. 7 illustrates a section through a cooling tube 5 with compensators 15 which are arranged at one end of the cooling tube 5. The compensator 15 consists of a plurality of bellows-shaped windings. High temperature differences between the cooling tube and the cooling medium may cause strains in the cooling tube 5. These strains which may extend both in the longitudinal and in the transverse directions of the cooling tube are absorbed and reduced by the compensator 15 since the compensator 15 is, due to its construction, capable of yielding such strains by defined deformation.

FIG. 8 illustrates a schematic temperature diagram about the temperature profile from the middle of the transport tube 2 to the ambient temperature outside the cooling tube 5. Assuming that the material to be cooled is poured into the filling cone at a temperature A ° C., the material to be cooled will already cool down slightly in the core during the introduction into a transport tube and the temperature will continuously decrease toward the outside. As soon as the material to be cooled touches the inner wall of the transport tube 2 a substantial cooling effect will be determined, which is designated with the temperature B ° C. in FIG. 8. The temperature profile in the tube wall of the transport tube 2 will extend substantially linearly. At the outer wall of the transport tube 2 a temperature of C ° C. would accordingly exist. In the annular gap of the cooling tube 5 and of the transport tube 2 the cooling medium ideally flows in a turbulent flow, but nevertheless a temperature profile can be determined which proceeds from a higher temperature C ° C. to a lower temperature D ° C. In the cooling tube wall, finally, a temperature profile from D ° C. to E ° C. can be determined. Outside the cooling tube 5 ambient temperature exists.

What is claimed is:

1. A rotary cooler comprising:
   a plurality of open transport tubes having a circular cross-section for transporting material to be cooled indirectly,
   wherein the plurality of transport tubes are arranged about an axis of rotation and are each adapted to be filled jointly via a filling region with material to be cooled,
   wherein each transport tube arranged concentrically within a respective cooling tube of a plurality of cooling tubes, and the indirect cooling of the material to be cooled takes place via the plurality of transport tubes which are flown around by a cooling medium within the plurality of cooling tubes and cools the material to be cooled via a wall of the transport tube, and
   wherein the plurality of cooling tubes are connected to a single tube via supply tubes which are arranged in a spoke-like manner, wherein the cooling medium is fed into the single tube and flows via the supply tubes into the cooling tubes.

2. The rotary cooler with the features of claim 1, wherein the plurality of transport tubes are arranged in bundles in regions, and that these regions are adapted for the bearing or rotation of the rotary cooler.

3. The rotary cooler with the features of claim 2, wherein the rotation is performed via a gear ring with chain drive or a sprocket.

4. The rotary cooler with the features of claim 1, wherein the plurality of transport tubes end in a region in which the material to be cooled exits.

5. The rotary cooler with the features of claim 1, wherein the transport tubes are inclined from the region of a product inlet to the region of a product outlet, preferably up to 5 degrees.

6. The rotary cooler with the features of claim 1, wherein the cooling tubes are adapted to be pressurized.

7. The rotary cooler with the features of claim 1, wherein a direction of flow of the cooling medium is optionally contrary to or in line with a direction of transport of the material to be cooled.

8. The rotary cooler with the features of claim 1, wherein elements are provided within the transport tubes which promote the mixing and circulating of the material to be cooled.

9. The rotary cooler with the features of claim 8, wherein the elements are arranged in the longitudinal direction of the transport tubes.

10. The rotary cooler with the features of claim 1, wherein an annular gap between the transport tube and the cooling tube comprises elements favoring a turbulent flow of the cooling medium.

11. The rotary cooler with the features of claim 1, wherein at least one flow directing element is provided in an annular gap between the transport tube and the cooling tube.

12. The rotary cooler with the features of claim 11, wherein the at least one flow directing element is arranged on an outer wall of a transport tube.

13. The rotary cooler with the features of claim 12, wherein the at least one flow directing element is arranged on the outer wall of a transport tube in the shape of a screw winding.

14. The rotary cooler with the features of claim 1, wherein the cooling tubes are provided with compensators compensating thermal strains.

15. A method for cooling bulk material using a rotary cooler comprising a plurality of transport tubes for transporting material to be cooled indirectly, wherein the plurality of transport tubes are arranged about an axis of rotation and are adapted to each be filled jointly via a filling region with material to be cooled, wherein each transport tube is arranged concentrically within a respective cooling tube of a plurality of cooling tubes and the indirect cooling of the material to be cooled takes place via the plurality of transport tubes which are flown around by cooling medium and cools the material to be cooled via a wall of the transport tube, wherein the plurality of cooling tubes are connected to a single tube via supply tubes which are arranged in a spoke-like manner, wherein the cooling medium is fed into the single tube and flows via the supply tubes into the cooling tubes, the method comprising the steps of:
    introducing material to be cooled in an open transport tube having a circular cross-section which is enclosed by a cooling tube in which a cooling medium flows, wherein the cooling medium is water;
    transporting the material to be cooled from one end of the transport tube to the other end thereof, wherein the material to be cooled is cooled by the cooling medium;
    rotating the transport tubes about an axis; and
    outputting the cooled transport material.

16. The method for cooling bulk material with the features of claim 15, further comprising the method step according to which the cooling medium is set to circulate by baffles in an annular gap between the transport tube and the cooling tube.

* * * * *